April 23, 1963 G. M. E. WILLIAMS 3,086,780

SOUND REPRODUCING MACHINES

Filed July 26, 1960 2 Sheets-Sheet 1

INVENTOR
GARNET MONTAGUE EVELEIGH WILLIAMS
BY [signature]
ATTORNEY

April 23, 1963 G. M. E. WILLIAMS 3,086,780

SOUND REPRODUCING MACHINES

Filed July 26, 1960 2 Sheets-Sheet 2

INVENTOR
GARNET MONTAGUE EVELEIGH WILLIAMS
BY [signature]
ATTORNEY 3,086,780
Patented Apr. 23, 1963

3,086,780

SOUND REPRODUCING MACHINES

Garnet Montague Eveleigh Williams, Cranleigh, England, assignor to Foster-Mallard Limited, London, England Filed July 26, 1960, Ser. No. 45,386
4 Claims. (Cl. 274—10)

This invention relates to sound reproducing machines utilizing disc-shaped records and having a pick-up provided with styli projecting in opposite directions perpendicular to its plane of inward and outward movement across the records to enable the recordings on both sides of the records to be played without turning the said records over.

In disc-shaped records for providing stereophonic reproduction, tracks recording the sound picked up from two spaced microphones during recording are provided one on each side wall of the record groove, and it will be apparent that if a side of a record is played by a stylus projecting to one side of the plane of movement of the pick-up, the positions of the two groove walls relative to the stylus will be opposite to their relative positions when the record is played by a stylus projecting to the other side of the said plane. In the absence of any means of correction, therefore, the distribution of the reproduced sound will be reversed.

It is the object of the present invention to overcome this disadvantage.

According to the present invention, in a sound reproducing machine utilizing disc-shaped records, and having a pick-up provided with styli projecting in opposite directions perpendicular to its plane of inward and outward movement across the records to enable the recordings on both sides of the records to be played without turning the said records over, two output circuits of said pick-up are connected to separate amplifier circuits through a change-over switch device controlled by means for selectively moving the pick-up into playing relationship with records on opposite sides thereof, so that the connections of the pick-up output circuits to the amplifiers are changed over when the pick-up moves from a position for playing a record on one side thereof to a position for playing a record on the other side thereof.

The pick-up is preferably controlled by a swinging arm caused to make a to-and-fro oscillating movement during a change cycle, the switch device being so operated by the said swinging arm that the pick-up is short-circuited during the change cycle.

Movement of the pick-up to engage one or other stylus thereon with a record surface may be controlled by a double ramp member movable in a plane parallel to the plane of oscilaltion of the swinging arm the ramps on said ramp member co-operating with a stem engaging a pick-up arm carrying the pick-up, the swinging arm having mounted on it a pair of contacts connected to the pick-up one in each output circuit of the pick-up, and an oscillating plate coupled to the double ramp member having on it two contact surfaces connected respectively to the two amplifiers, the arrangement being such that movement of the ramp member and oscillating plate from one position to another reverses the connections between the contacts and the contact surfaces.

A third contact surface may be provided on the oscillating plate, the said third contact surface being connected directly to the pick-up and, when the swinging arm moves from its normal position during a change cycle, being engaged by both contacts so that the pick-up is then short-circuited.

One form of sound reproducing machine in which the invention may be embodied includes means for supporting a stack of records in an upper position concentrically above a turntable and rotating them so that the recording on the underside of each record may be played before that record is dropped on to the turntable, using an upwardly projecting stylus on the pick-up, the recording on the upper side of each record being played after the record has dropped, by a second stylus projecting downwardly from the pick-up.

In the following description, which refers to the accompanying drawings, the invention is described as embodied in a sound reproducing machine of the form set out in the last preceding paragraph, but it will be understood that the invention is not limited to this form of sound reproducing machine.

Figures 1, 2:
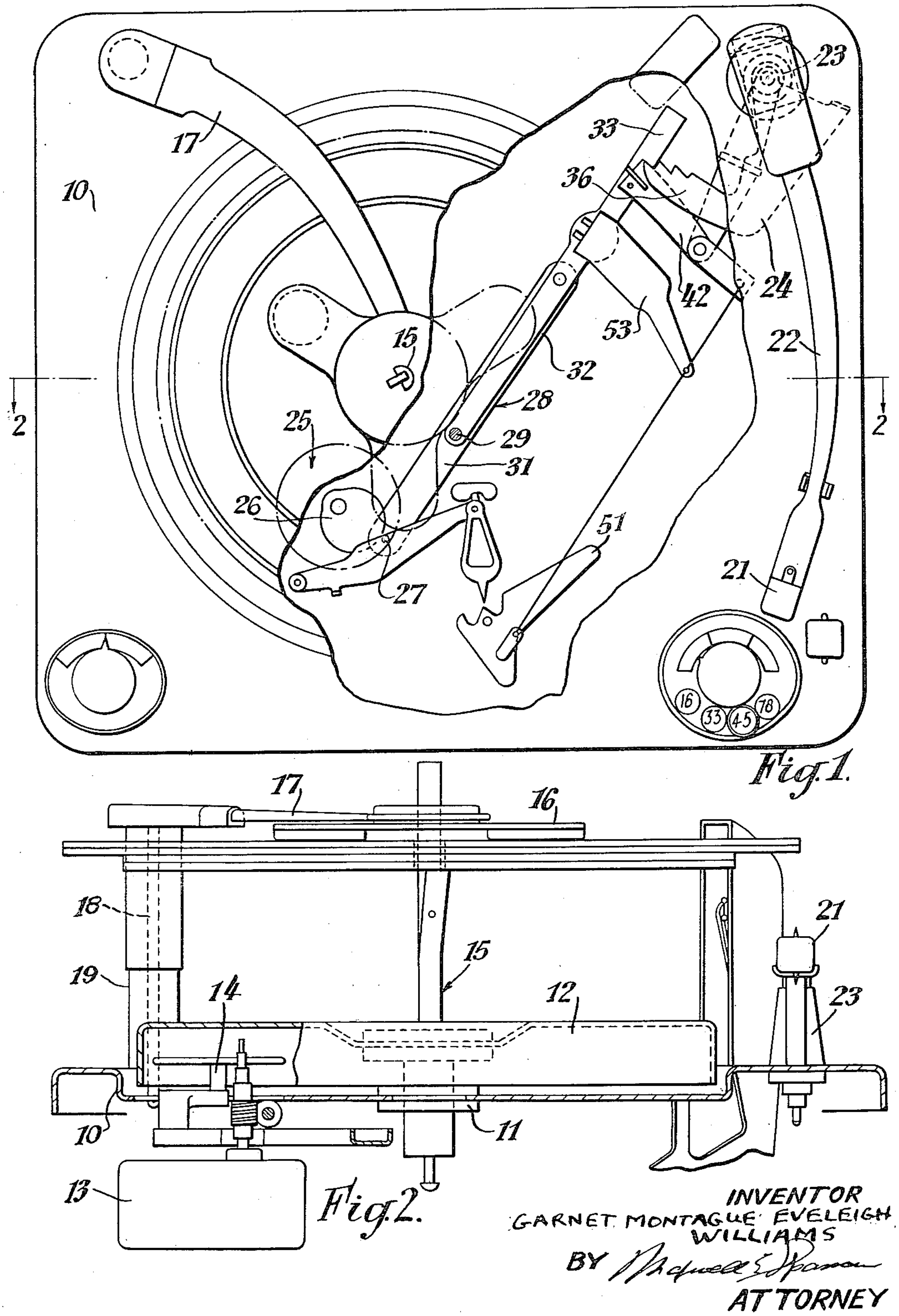
FIGURE 1 is a plan view of a sound reproducing machine embodying the invention some parts having been omitted.
FIGURE 2 is an elevation, partly in section, of the machine shown in FIGURE 1.

Referring to the drawings, the machine comprises a base-plate 10 in which is mounted a bearing 11 for a turntable 12 driven by an electric motor 13 through one or other of two friction wheels forming part of a drive reversing mechanism 14. A spindle 15 projecting upwardly from the centre of the turntable 12 is arranged to support a stack of records co-axially above the turntable, and releasing mechanism is provided to release the records one-by-one and allow them to fall on to the turntable. The turntable 12 and the spindle 15 is driven by means of the drive reversing mechanism 14 alternately in clockwise and counterclockwise directions, one for reproducing the top side of a record and the other for reproducing the bottom side of the record. An upper turntable 16, rotated by the spindle 15 through a key and slot arrangement or an equivalent driving means, is rotatably supported on an arm 17 carried by a rod 18 slidable and rotatable in a pillar 19 standing up from the base-plate 10, the arm 17 holding the upper turntable in a plane perpendicular to the axis of the spindle 15 so that, by resting on the uppermost of the stacked records, it holds the said records against tilting.

A pick-up 21 is mounted on a pick-up arm 22, pivoted about a horizontal axis on a bracket carried by the upper end of a tubular vertical spindle 23 so that the said arm is capable of swinging movement inwardly and outwardly across the records, and is also movable upwardly and downwardly to bring the pick-up into playing relation with the surfaces of records above and below it. The pick-up carries two styli projecting upwardly and downwardly respectively.

The tubular spindle 23 carries, at its lower end, a plate 24. A rotary control unit 25, which makes a single revolution to effect a control cycle for setting the machine to play each recording, and to shut-off the machine when the playing of a stack of records has been completed, includes a cam 26 engaged by a follower 27 on one end of a compound arm 28 pivoted at 29 on the base-plate 10, the compound arm 28 comprising two parts 31 and 32, mounted respectively above and below the base-plate 10, the said parts being connected one to the other by the pin about which the lever pivots and also by a bolt or the like passing through an arcuate slot in the base-plate. At its end remote from the follower 27, the arm 28 carries a pair of resilient fingers 33 each formed with an inwardly directed pip 34, the two pips being co-axial. The plate 24 is formed on each side with a groove 35, radial to its pivot, the two grooves being co-extensive, and an arcuate arm 36 integral with the said plate is shaped to provide three steps 37, 38, 39.

The pick-up arm 22 is caused to swing outwardly and then inwardly during a control cycle by oscillating movement applied to the compound arm 28 by the cam 26, the pips 34 engaging in the grooves 35 to transmit the movement to the plate. A stop 41, movable into the path of one or other of the steps 37, 38, 39 during the inward movement of the pick-up arm by a sizing mechanism, stops such inward movement at a suitable point depending on the size of the record next to be played, the pips 34 being then pulled out of the grooves 35 by the continued movement of the compound arm 28.

The upward and downward movements of the pick-up arm are controlled by a ramp member 42, pivoted at 43 on one end of a lever 44 which is in turn pivoted on a bracket 45 fixed to the underside of the base-plate 10, the other end of the lever 44 engaging a rod 46 extending through the tubular spindle 23 to engage the pick-up arm.

The ramp member 42 is formed at one end with two side-by-side ramps 47 and 48, inclined upwardly and downwardly respectively, the said ramps co-operating with a pin 49 projecting downwardly from the part 32 of the compound arm 28 so that, at the end of a cycle of movement, the said pin 49 engages one or other of the said ramps and the lever 44 is rocked to lift or lower the pick-up.

A rocking member 51, pivoted on the underside of the base-plate 10 is rocked alternately in opposite directions under the control of the control unit 25, so as to move in one direction during one control cycle and in the other direction during the next control cycle, this rocking member being coupled by a rod 52 to the ramp member 42, and is also coupled to the drive reversing mechanism 14 for the turntable and to means determining whether or not a record is released during that control cycle.

The rod 52 is also coupled to a switch arm 53, pivoted at 54 on the underside of the base-plate 10, so that the switch arm 53 is moved to-and-fro through a small angle with the ramp member 42.

The pick-up 21 has two output circuits arranged to respond respectively to sound tracks on opposite side walls of a record groove, as is well known in stereophonic reproduction, and these two output circuits are connected to separate amplifiers feeding separate loud speakers.

Figures 3, 4, 5:
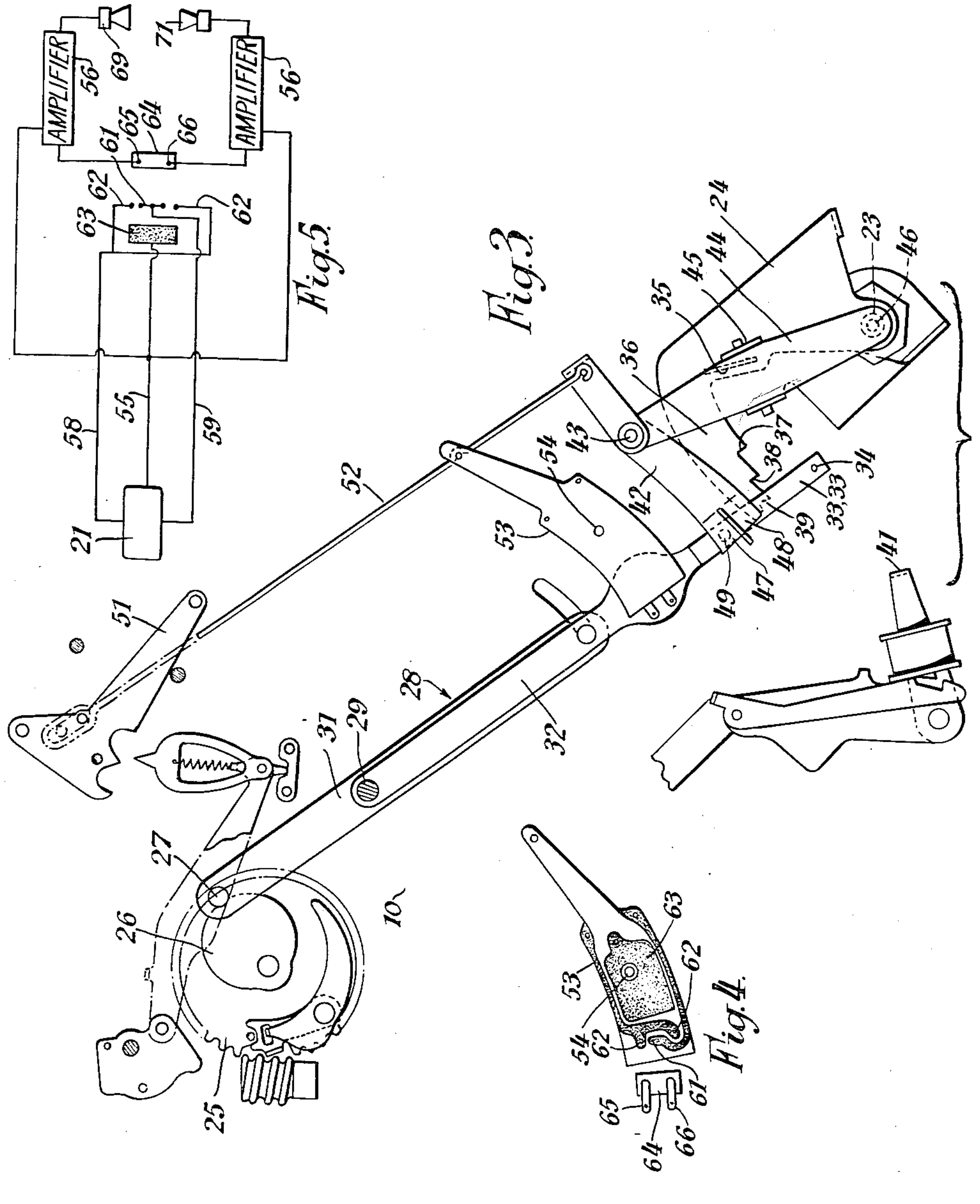
FIGURE 3 is a plan view, on an enlarged scale, of the change-over switch device in one position which it takes up during the playing of a record.
FIGURE 4 is a plan view of the parts of the switch mechanism separated from one another and from their associated parts.
FIGURE 5 is an electrical circuit diagram showing the connections between the pick-up, the amplifiers, and loud speakers.

Each of the output circuits of the pick-up 21 includes a common conductor 55 (FIGURE 5) leading from the pick-up 21 to the two amplifiers 56 and 57, and one of two other conductors 58 and 59. The switch arm 53 has applied to it, by printing or other means, two contact areas 61 and 62 to which the conductors 58 and 59 are respectively connected, the contact area 61 lying between two portions of the contact area 62, as shown in FIGURE 5, so that an arc struck from the pivot of the switch arm 53 passes through the contact area 61 and through both portions of the contact area 62. A third contact area 63 on the switch arm 53 lying between the contact areas 61, 62 and the pivot of the switch arm, is connected to the common conductor 55.

The part 32 of the compound arm 28 carries, on an insulating pad 64 secured thereto, a pair of raised contacts 65 and 66 connected, respectively, by conductors 67 and 68 to the two amplifiers 56 and 57, each of which operates one of two loud speakers 69 and 71.

The arrangement is such that, when the compound arm 28 is in the position it occupied during playing of a record, the raised contacts 65, 66, lie on the arc about the pivot of the switch arm 53 which passes through the contact areas 61, 62. The angle of movement of the switch arm 53 is such that, in one of its extreme positions, the contact 65 engages one portion of the contact area 62 and the contact 66 engages the contact area 61, whereas in the other extreme position of the switch arm the contact 66 engages the other portion of the contact area 62, and the contact 65 engages the contact area 61. Thus, since the switch arm 53 moves with the other parts determining whether the machine is set for topside or underside playing, the connections of the pick-up to the amplifiers are reversed when a change is made from playing the top side to playing the underside of a record or vice versa, and the distribution of the reproduced sound between the two loud speakers is the same for any given record side, regardless of whether it is played facing upwardly or downwardly.

When the compound arm 28 is moved by the cam 26 to swing the pick-up arm outwardly, the contacts 65 and 66 move on to the contact area 63, thus short-circuiting the inputs to the amplifiers and preventing any extraneous vibrations or the like occurring during the change cycle from producing noise in the loud speakers.

I claim:

1. In a sound reproducing machine utilizing disc-shaped records having a pick-up arm carrying a pick-up, said pick-up being adapted for holding styli projecting in opposite directions perpendicular to the plane of the inward and outward movement of said pick-up across the plane of said records for playing said records on both sides thereof without turning said records over; in combination two output circuits on said pick-up, two separate amplifier circuits having connections to said output circuits, a change-over switching device for changing over said connections of said pick-up output circuits to said amplifier circuits when said pick-up moves from a position for playing one of said records on one side thereof to a position for playing said one of said records on the other side thereof, and means for selectively moving said pick-up into playing relationship with said records on opposite sides thereof, said means controlling the movement of said change-over switching device.

2. A sound reproducing machine, according to claim 1, and further comprising a swinging arm controlling said pick-up, said swinging arm performing an oscillating movement during a change cycle of said pick-up from a position for playing one of said records on one side thereof to a position for playing said one of said records on the other side thereof, and first contact means on said switching device arranged for short-circuiting said pick-up during said change cycle when said switching device is operated by said swinging arm.

3. A sound reproducing machine, according to claim 2, and further comprising a double ramp member movable in a plane parallel to the plane of oscillation of said swinging arm, said member controlling the movement of said pick-up for engaging one or the other of said styli thereon with the surface of one of said records, a stem cooperating with the ramps on said member, said stem engaging a said pick-up arm carrying said pick-up, a pair of second contact means mounted on said swinging arm, said second contact means being connected to each one of said output circuits on said pick-up, and an oscillating plate linked to said member, said oscillating plate having two contact surfaces connected to said amplifiers, said member and said plate being arranged for reversing the connections of said second contact means of said swinging arm with said contact surfaces of said oscillating plate by their movement from one position to the other.

4. A sound reproducing machine, according to claim 3, and further comprising a third contact surface on said oscillating plate and direct connection means between said third contact surface and said pick-up for short-circuiting said pick-up by engaging said pair of said second contact means of said swinging arm with said third contact surface on said oscillating plate when said swinging arm moves from its normal position during said change cycle.

References Cited in the file of this patent

UNITED STATES PATENTS

| | | |
|---|---|---|
| 2,093,540 | Blumlein | Sept. 21, 1937 |
| 2,949,310 | Mueller | Aug. 16, 1960 |